United States Patent [19]

Deuel

[11] Patent Number: 5,442,724
[45] Date of Patent: Aug. 15, 1995

[54] TOOL FOR TERMINATING A FIBER OPTIC CABLE TO A CONNECTOR

[75] Inventor: Gregory F. Deuel, Lancaster, Pa.

[73] Assignee: The Whitaker Corporation, Wilmington, Del.

[21] Appl. No.: 315,733

[22] Filed: Sep. 30, 1994

[51] Int. Cl.⁶ .................................................. G02B 6/25
[52] U.S. Cl. ......................... 385/134; 385/76; 385/78; 385/136; 385/137; 385/139; 385/85; 385/81
[58] Field of Search ............ 385/77, 78, 76, 81, 385/84, 85, 134, 135, 136, 137, 139; 225/100, 101, 103, 104, 105

[56] References Cited

U.S. PATENT DOCUMENTS

| | | | |
|---|---|---|---|
| 4,333,705 | 6/1982 | Mead | 385/134 X |
| 4,377,323 | 3/1983 | Schneider | 385/134 X |
| 4,463,886 | 8/1984 | Thornton | 225/101 |
| 4,537,466 | 8/1985 | Moisson et al. | 385/137 X |
| 4,687,287 | 8/1987 | Lukas et al. | 385/134 X |
| 5,074,021 | 12/1991 | Feng et al. | 29/281.5 |
| 5,206,921 | 4/1993 | Okada et al. | 385/134 |
| 5,235,664 | 8/1993 | Okada et al. | 385/134 |
| 5,261,020 | 11/1993 | de Jong et al. | 385/76 |
| 5,307,432 | 4/1994 | Chin et al. | 385/81 |
| 5,351,334 | 9/1994 | Chun et al. | 385/134 |

Primary Examiner—Brian Healy
Attorney, Agent, or Firm—Robert J. Kapalka

[57] ABSTRACT

A hand tool (40) is disclosed for terminating an optical fiber (26) of a cable (10) to a crimp contact (14) of a connector. The tool includes a carriage assembly (60) that utilizes a delicate spring (250) to provide a desired abutting force at the point of engagement of the optical fiber with the connector contact. The carriage (64) slides along a pair of guide rails (70, 72) rigidly held by a base (62). A counterweight (80) is also arranged to slide on the guide rails and is coupled to the carriage by means of two pulleys (106) and a thin steel cable (230) so that when the carriage moves in one direction the counterweight moves in an opposite direction an equal amount. The counter weight has a mass that is substantially equal to the combined masses of the carriage and the cable so that the system is balanced and unaffected by gravity or sudden movements, thereby assuring that the abutting force is maintained within desirable limits, even when the tool is tilted somewhat with respect to the horizontal plane.

11 Claims, 7 Drawing Sheets

TOOL FOR TERMINATING A FIBER OPTIC CABLE TO A CONNECTOR

The present invention relates to hand tools for terminating the end of an optical fiber to a connector, and more particularly to a mechanism for providing a constant abutting force between the optical elements during termination.

BACKGROUND OF THE INVENTION

Figures 1, 2:
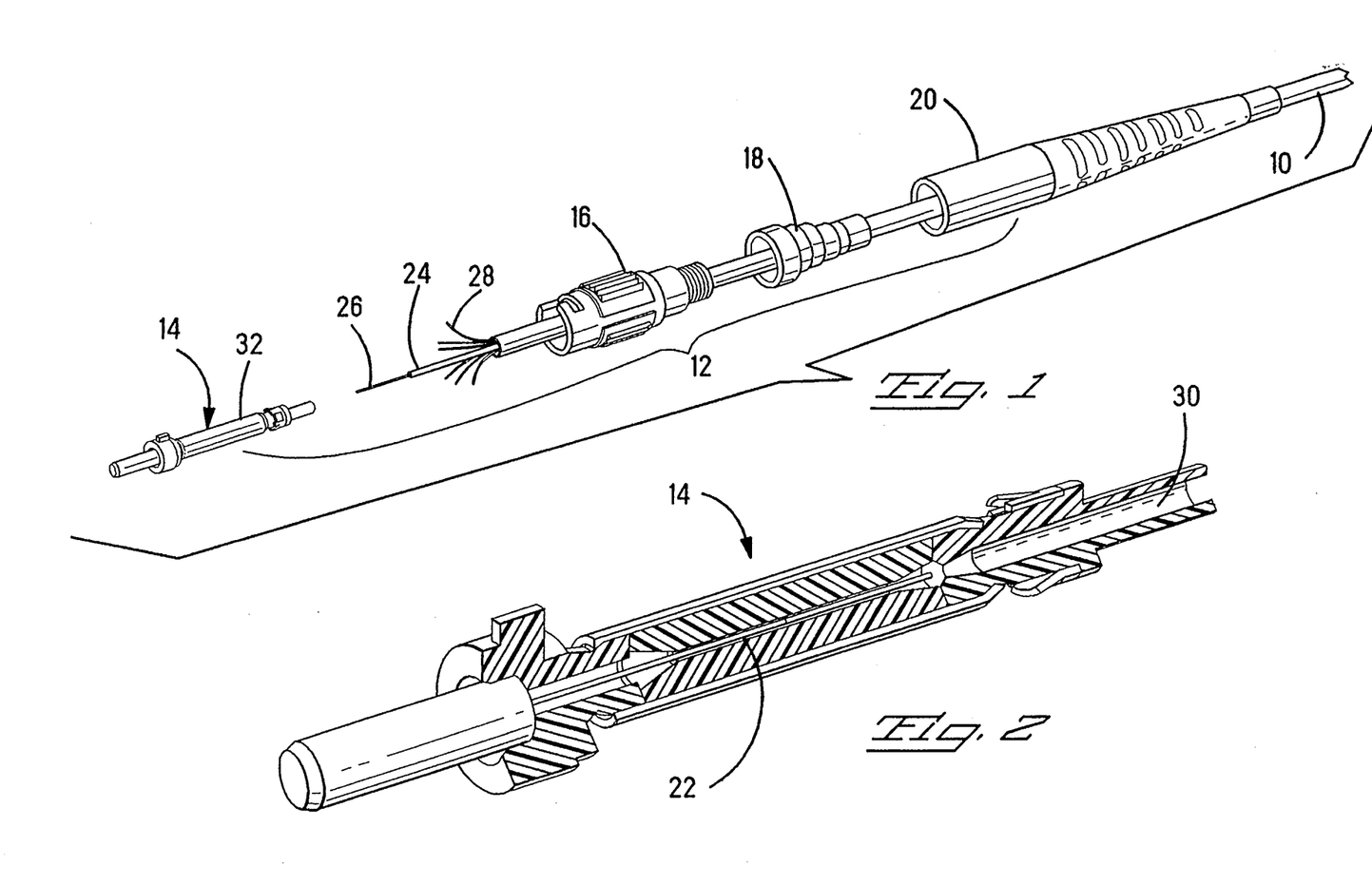
FIG. 1 is an isometric view of an optical cable and connector showing the parts in position for assembly.
FIG. 2 is an enlarged isometric view of the crimp contact shown in FIG. 1.

A typical fiber optic cable 10 and connector 12 are shown in an exploded parts view in FIG. 1. The connecter 12 includes a crimp contact 14, bayonet housing subassembly 16, a crimp eyelet 18, and a ribbed strain relief 20. The crimp contact 14 includes a pre-installed optical fiber 22 having one end pre-polished. The strain relief 20, crimp eyelet 18, and housing subassembly 16 are positioned on the cable 10, as shown, and the end of the cable stripped back to expose the buffer material 24 and the optical fiber 26. Strength members 28, which run between the buffer material and the outer jacket, are also exposed. The tip of the optical fiber 26 is cleaved to a specific length and then is inserted into an opening 30 of the crimp contact 14 until it abuttingly engages the cleaved end of the optical fiber 22. The two ends are maintained in abutting engagement with a force of about 50 grams as the contact 14 is crimped onto the optical fiber 26 in the area indicated at 32. The housing subassembly 16 and crimp eyelet 18 are then slid into place and the eyelet crimped to secure the connector to the outer jacket of the cable 10. The strain relief is then slid into engagement with the crimp eyelet 18 to complete the termination. While large, complex, and expensive machinery may be utilized for such manufacturing operations, it would be desirable to utilize a less expensive hand tool. Hand tools for aiding in these manufacturing operations have been developed, however, holding the optical fiber 26 in abutting engagement with the end of the pre-installed optical fiber 22 while maintaining the desired level of abutting force is difficult to accomplish in a hand tool. Typically, a movable carriage holding the cable is used to move the end of the optical fiber into engagement with the connector. A spring acting on the carriage is used to supply the desired abutting force. However, the tool must be held in a horizontal position so that gravity does not adversely affect the operation of the tool. Should the tool be tilted slightly off the horizontal, the weight of the carriage mechanism operated on by the spring causes the carriage to tend to move in the direction of the tilt., independent of the operation of the spring. This, of course, adversely affects the reliability of the tool and of the termination.

What is needed is a hand tool for terminating an optical fiber cable to a connector that is simple to use, reliable, and is substantially unaffected by sudden movements or gravity should the tool be tilted somewhat during operation.

SUMMARY OF THE INVENTION

A tool is disclosed for attaching an end of an optical fiber of a fiber optic cable to a connector. The tool includes a frame, a nest within the frame for receiving the connector, and crimping apparatus coupled to the frame for terminating the cable to the connector. A carriage assembly is coupled to the frame and arranged to hold the cable and move the end of the optical fiber along a first axis in a first direction toward and into abutting engagement with the connector and in a second direction, opposite the first direction, away from the connector. The carriage assembly is arranged to maintain the end of the optical fiber in abutting engagement with the connector at a predetermined level of force that is substantially unaffected by the force of gravity or sudden movements. The carriage assembly includes a base, a carriage for holding the cable and being slidably coupled to the base, and a counterweight coupled to the carriage and the base. The counterweight has a mass that is proportional to the combined masses of the cable and the carriage. The counterweight is movable only along a second axis that is parallel to the first axis, so that when the carriage moves in the first or second directions, the counterweight moves in an opposite direction.

DESCRIPTION OF THE FIGURES

FIGS. 6, 7, and 8 are front, tops and end views, respectively, of the carriage assembly shown in FIG. 3;

DESCRIPTION OF THE PREFERRED EMBODIMENT

Figure 3:
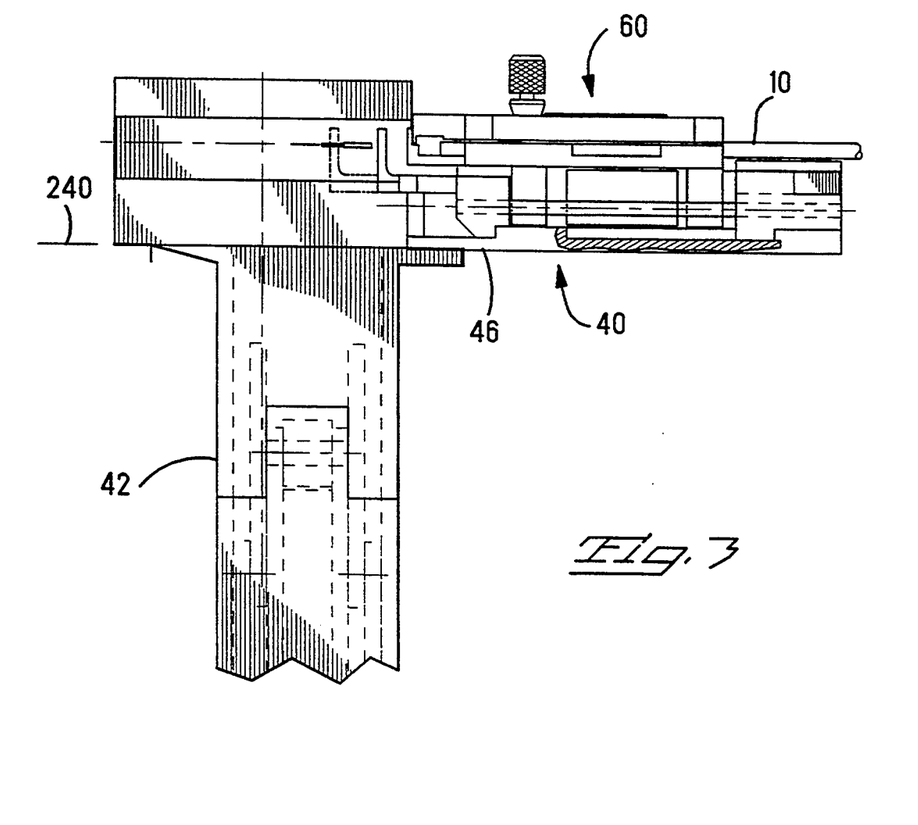
FIGS. 3, 4, and 5 are front, end, and top views, respectively, of a hand tool incorporating the teachings of the present invention.
Figure 4:
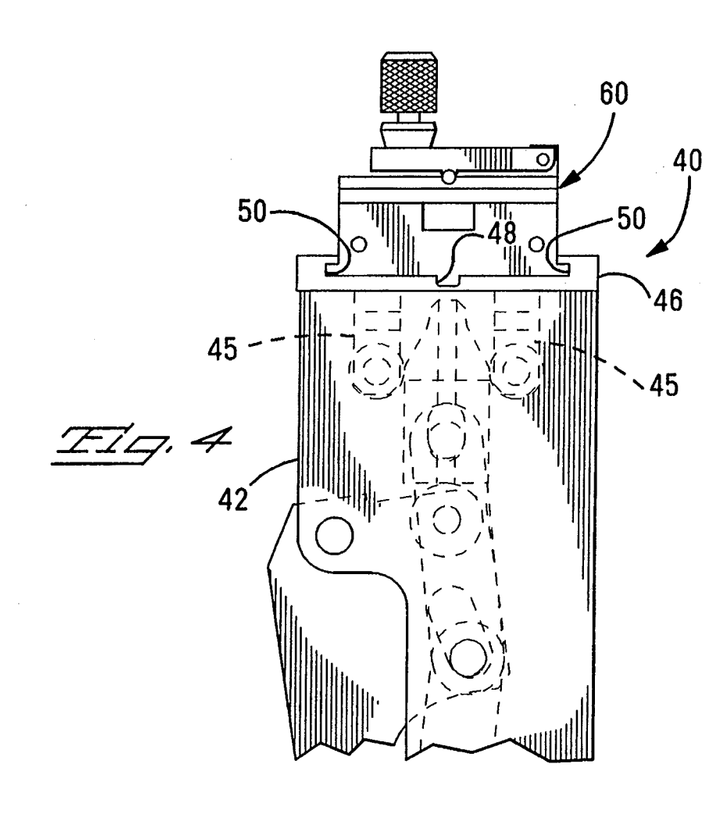
Figure 5:
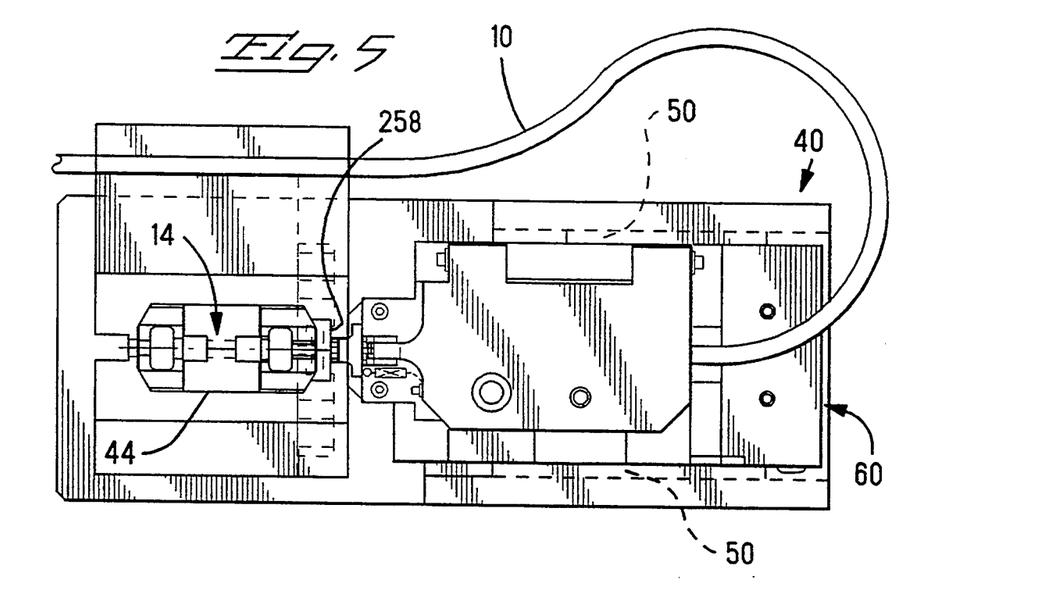

There is shown in FIGS. 3, 4, and 5, a tool 40 for assembling the optical fiber 26 to the crimp contact 14 of the connector 12 that is shown in FIG. 1. The tool 40 includes an operable handle 42, a connector nest 44 for receiving and positioning the crimp contact and crimp tooling, not shown, that is operable by the handle and related linkages 45 in the usual manner for crimping the crimp contact onto the optical fiber. The tool 40 includes a bed 46 having a keyway 48 and a pair of slots 50 formed in opposite side walls of the bed for receiving and guiding a carriage assembly 60.

Figure 6:
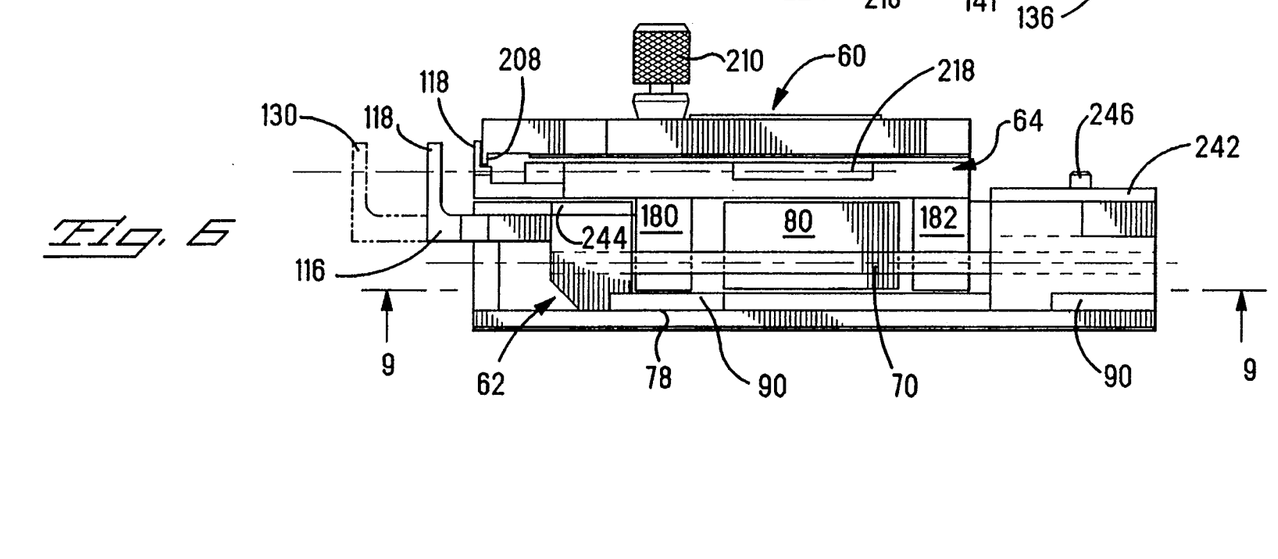
Figure 7:
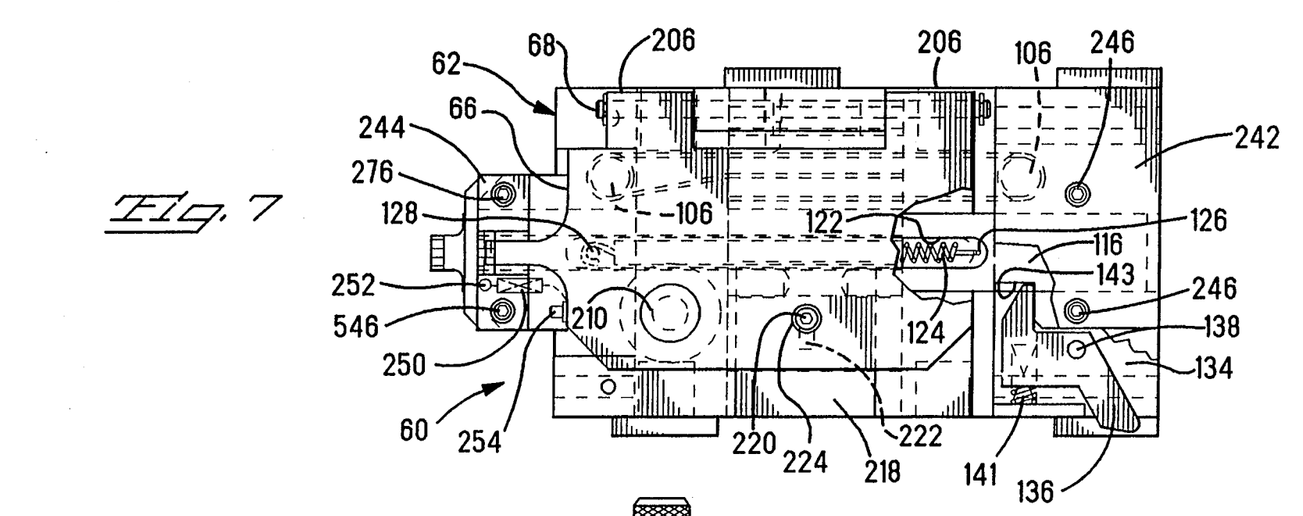

The carriage assembly 60, as shown in FIGS. 6, 7, and 8, includes a base 62, a carriage 64, and a clamping member 66 hingedly attached to the carriage by means of a hinge pin 68. A pair of guide rails 70 and 72 are fixed in bores 74 and 76, respectively, in the base 62, and are arranged mutually parallel and parallel to a bottom mounting surface 78 of the base. As will be explained, the carriage 64 is arranged to slide along the rails 70 and 72. Further, a counterweight 80 is also arranged to slide along the rails 70 and 72 in correspondence with movement of the carriage. Before proceeding with a description of and purpose for these sliding movements, the base 62, carriage 64, and counterweight 80 will be described in more detail.

Figure 10:
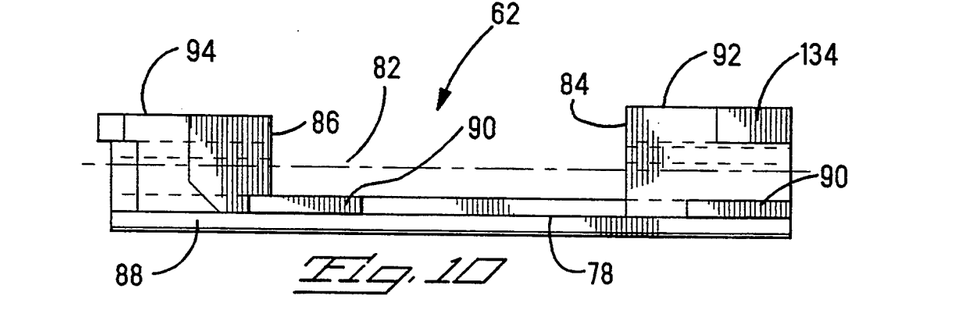
FIGS. 10, 11, and 12 are front, top, and end views, respectively, of the base shown in FIG. 6.
Figure 11:
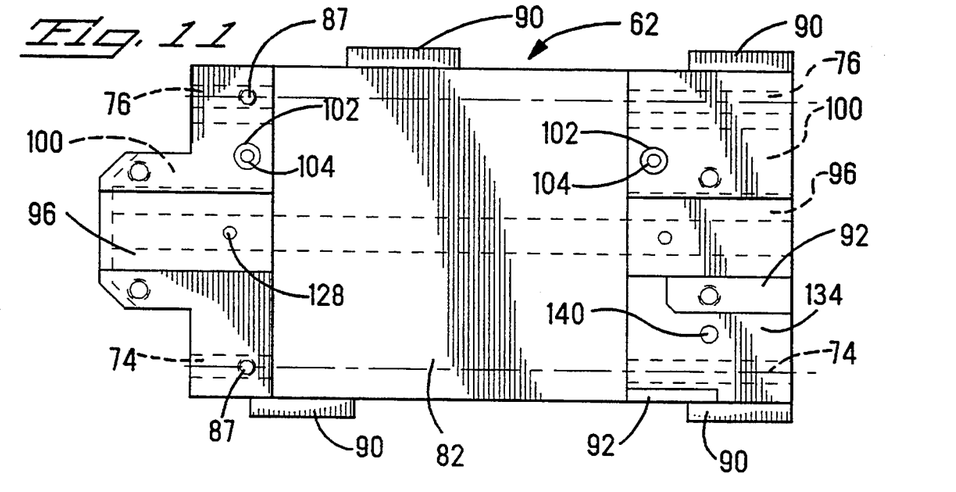
Figure 12:
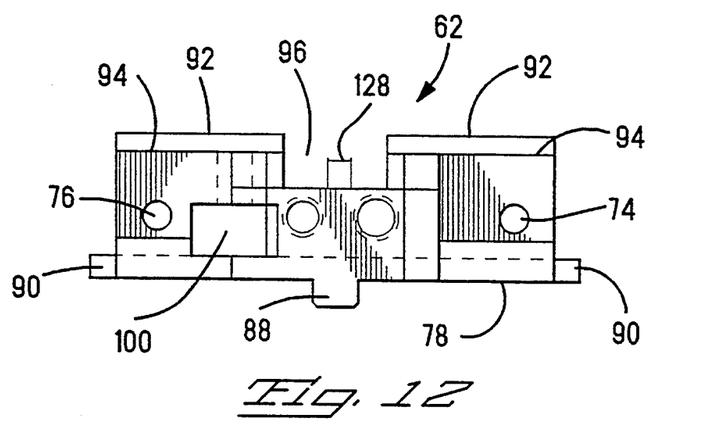

As shown in FIG. 10, 11, and 12, the base 62 includes a cutout 82 having two opposing side walls 84 and 86. The two bores 74 and 76 extend completely through the base 62 and their axes are mutually parallel and parallel with the mounting surface 78, as set forth above. Two threaded holes 87 are formed in the surface 94 and intersect the two bores 74 and 76. Set screws, not shown, are threaded into the holes 87 and serve to secure the two guide rails 70 and 72 in place. A key 88 extends from the surface 78 and runs parallel to the axes of the bores 74 and 76 for the entire length of the base 62. The key is sized to be a slip fit in the keyway 48 in the bed 46, when in the position shown in FIGS. 3 and 4. Four flanges 90 extend outwardly from opposite sides of the base 62, two flanges extending from each side as shown, so that their bottom surfaces are flush with the mounting surface 78. The flanges 90 are sized so that they will enter the slots 50 with a small amount of side clearance but with no appreciable vertical play, as viewed in FIG. 4. The base 62 includes two top surfaces 92 and 94 on either side of the cutout 82. A slot 96 is formed in the top surfaces 92 and 94, completely through the base and parallel to the axes of the bores 74 and 76 for a purpose that will be explained below. A rectangular opening 100 extends through the base 62 parallel with the axes of the bores 74 and 76. As best seen in FIG. 11, a hole 102 is formed in each of the surfaces 92 and 94, extending through the opening 100 and into but not through the bottom of the base. A smaller knock out hole 104 extends completely through to the mounting surface 78. As shown in FIGS. 7 and 8, a brass pulley 106 is arranged in the opening 100 on each side of the cutout 82, the two pulleys being journaled for rotation on two pins 108 that are a slip fit with the holes 102. The knock out holes 104 are provided to aid in removal of the pins 108. The purpose of the pulleys will be explained below.

As best seen in FIG. 6, 7, and 8, an elongated cable support bar 116 is disposed within the slot 96 of the base 62 and is arranged to freely slide back and forth along the slot without appreciable side to side play. The cable support bar includes an upwardly turned end 118 having a V-shaped groove 120 formed therein. The purpose of the V groove is to cradle and guide the end of the cable 10 during insertion of the optical fiber 26 into the opening 30 of the crimp contact 14, as will be explained below. The cable support bar 116 has a longitudinally formed slot 122 running a substantial portion of its length, as best seen in FIG. 7. An extension spring 124 is disposed within the slot 122 and has one end attached to a small hole 126, as best seen in FIG. 7, and the other end attached to a pin 128 that is pressed into a hole formed in the floor of the slot 96, as best seen in FIGS. 11 and 12. The spring 124 is arranged to urge the cable support bar 116 outwardly toward the left to the position shown in phantom lines at 130 in FIG. 6. The cable support bar is movable to the rights-against the urging of the spring 124, from the position shown in phantom lines through the position shown in solid lines to a position spaced about two millimeters to the right thereof. A cutout 134 is formed in the surface 92 on one side of the slot 96, as best seen in FIGS. 10 and 11. A latch 136 is disposed within the cutout, as shown in FIG. 7, and is pivotally attached thereto by means of a pin 138 that is pressed into a hole 140 formed in the bottom of the cutout 134, as shown in FIG. 11. A spring 141 urges the latch to pivot about the pin 138 in a clockwise direction so that it engages a notch 143 formed in a side of the cable support bar 116, as shown in FIG. 7. When the cable support bar 116 moves from the position shown in phantom lines to the position shown in solid lines, the latch 136 engages the notch 143 and prevents return movement of the bar 116 toward the left but allows limited continuing movement to the right, as viewed in FIG. 7, for a purpose that will be described below.

Figure 13:
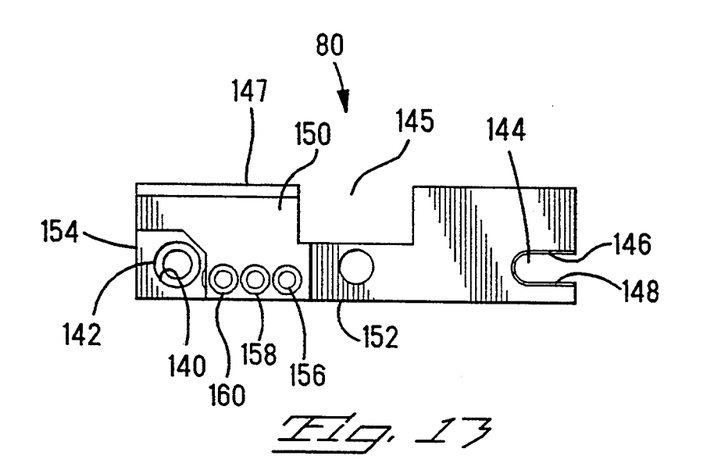
FIGS. 13 and 14 are front and end views, respectively, of the counterweight shown in FIG. 6.
Figure 14:
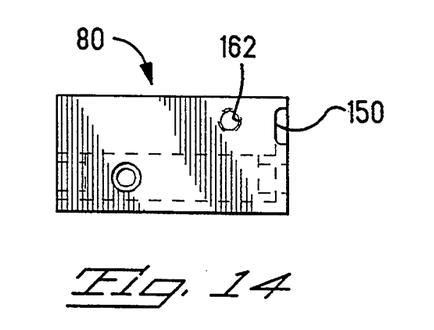

The counterweight 80, as shown in FIGS. 13 and 14, is a rectangular block of steel having a bore 140 through one end thereof containing a pair of spaced bearings 142. The inside diameters of the bearings are a slip fit with the guide rail 72. A round bottomed slot 144 having two side walls 146 and 148 is formed in an end of the counterweight 80 opposite the bore 140 and runs the full width of the counterweight. The two side walls 146 and 148 are formed parallel to the axis of the bore 140 and are spaced apart so that the guide rail 70 is received therebetween, as shown in FIGS. 6 and 8, with no appreciable vertical clearance yet the counterweight 80 is free to slide along the two guide rails 70 and 72. A cutout 145 is formed in a top surface 147 of the counterweight and is sized to provide clearance between the counterweight and the cable support bar 116. A shallow recess 150 is formed in one side of the counterweight adjacent one end of the bore 140, intersecting a bottom surface 152 and an end surface 154, as shown. Three spaced apart mutually parallel holes 156, 158, and 160 are formed through the counterweight, parallel to the bore 140, and intersect the floor of the recess 150 adjacent the bottom surface 152. A threaded hole 162 is formed in the end surface 154 adjacent the intersection of the recess 150 and the end surface.

Figure 15:
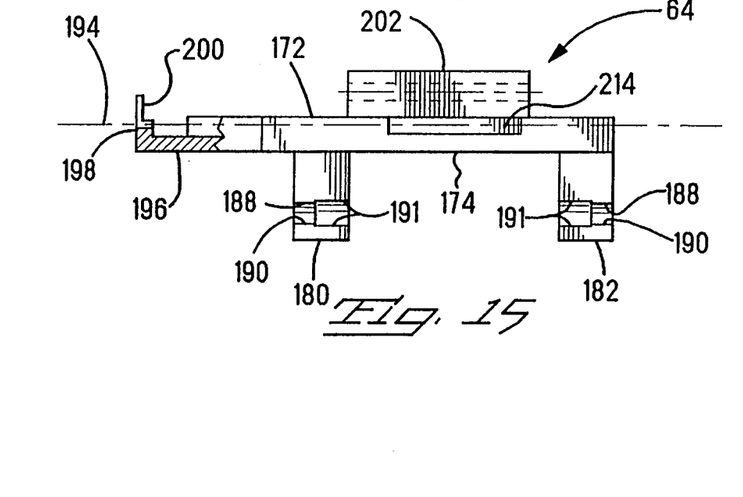
FIGS. 15, 16, and 17 are front, top, and end views, respectively, of the carriage shown in FIG. 6.
Figure 16:
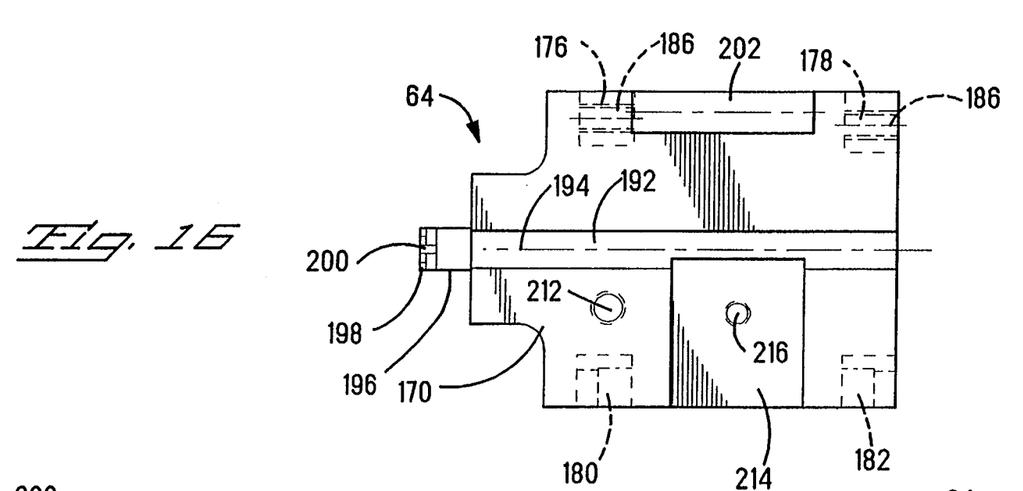
Figure 17:
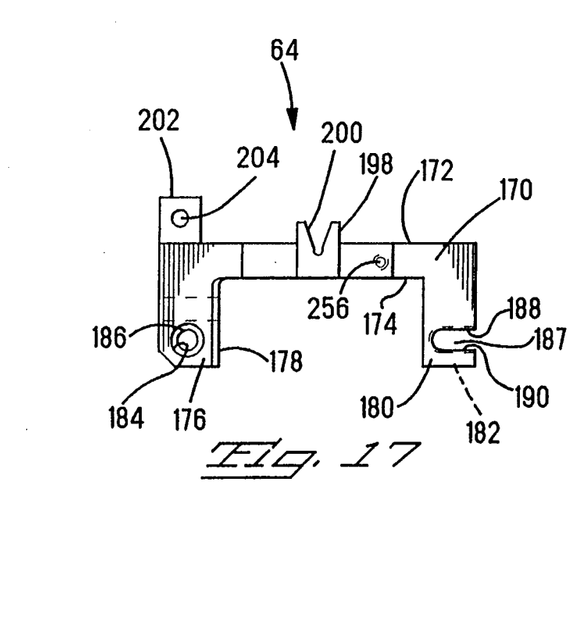

The carriage 64, as shown in FIGS. 15, 16, and 17, includes a plate 170 having a top surface 172 and a bottom surface 174. Four posts 176, 178, 180, and 182 extend downwardly from the bottom surface 174, as viewed in FIGS. 15 and 17, and are spaced as shown by the hidden lines in FIG. 16. A bore 184 is formed through the two posts 176 and 178 and a bearing 186 is disposed within the bore in each post. The inside diameters of the bearings are a slip fit with the guide rail 172. A round bottomed slot 187 having two side walls 188 and 190 is formed in each of the posts 180 and 182. The side walls 188 and 190 are substantially flat surfaces and formed parallel to the axis of the bore 184 and are spaced apart so that the guide rail 70 is received therebetween, as shown in FIGS. 6 and 8, with no appreciable vertical clearance yet the carriage 64 is free to slide along the two guide rails 70 and 72. The surfaces of the side walls 188 and 190 are relieved slightly as shown at 191 to reduce friction between the guide rail 70 and the posts 180 and 182. The bearings 186 and guide rail 72 and the side walls 188 and 190 and the guide rail 70 form a low friction slide that permits easy sliding movement of the carriage 64 with respect to the base 62. The posts 176, 178, 180, and 182 are spaced so that they fit within the cutout 82 in the base 62 with sufficient clearance to permit at least three millimeters of relative movement. Similarly, the space between the posts 176, 180 and the posts 178, 182, as viewed in FIGS. 15 and 6, will accommodate the counterweight 80 and provide for at least six millimeters of relative movement between the carriage posts and the counterweight. A cable guide groove 192 having an axis 194 is formed in the surface 172. The cable guide groove, in the present example, is V-shaped with a radiused bottom to accurately position the cable 10 so that the optical fiber 26 is coaxial with the axis 194. An additional guide member 196 extend from the left end of the plate 170, as viewed in FIGS. 15 and 16, and includes an upwardly turned portion 198 with a V-shaped groove 200 that holds a portion of the optical fiber 26 coaxial with the axis 194. A hinge post 202 extends upwardly from the surface 172 and has a hole 204 formed therethrough for receiving the hinge pin 68. As best seen in FIG. 7, the clamping member 66 has a pair of ears 206 that closely straddle the hinge post 202 so that there is little end play. Additionally, the clamping member includes a retainer 208 that extends downwardly and cooperates with the upwardly turned end 118 to hold the optical fiber 26 in axial alignment while the main body of the clamping member holds the cable 10 within the cable guide groove 192. As best seen in FIGS. 6 and 7, a quarter turn fastener 210 is attached to the clamping member 66 and engages a hole 212 formed in the surface 172 of the carriage 64. The fastener is held captive to the clamping member in the usual manner and provides a means for quickly loading and unloading a cable 10. A rectangular recess 214 is formed in the top surface 172 of the carriage and intersects the cable guide groove 192, as shown in FIGS. 15 and 16. A threaded hole 216 is disposed in the floor of the recess. As best seen in FIGS. 6 and 7, a cable guide plate 218 is secured within the recess 14 by means of a screw 220 threaded into the hole 216. The plate 218 has an elongated clearance hole for the screw 220 so that the position of the guide plate can be adjusted toward and away from the axis 194 for accurately positioning certain cables 10. A clearance hole 224 is formed through the clamping member 66 in alignment with the screw 220 so that adjustments can be made while the clamping member is closed.

Figure 9:
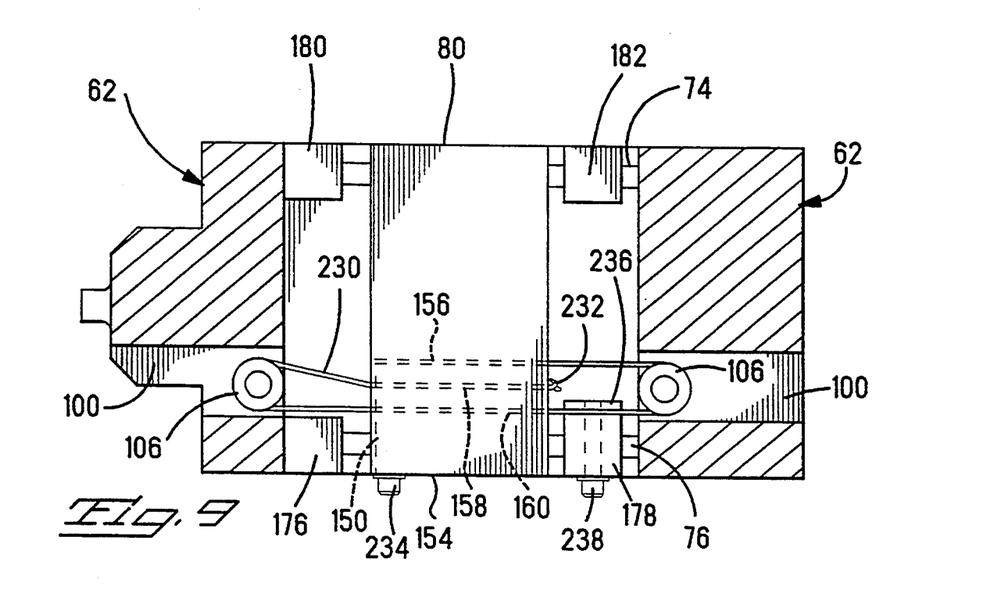
FIG. 9 is a cross-sectional view taken along the lines 9—9 in FIG. 6.

The counterweight 80, carriage 64, and base 62 are coupled together by means of the pair of pulleys 106 and a thin steel cable 230, as best seen in FIG. 9. The cable 230 is knotted at one end 232 and is threaded through the center hole 158 in the counterweight 80 so that the knot is against the right side of the counterweight. The cable 230 continues around the left most pulley 106 and back through the hole 160 to the other pulley 106, around that pulley and through the hole 156 in the counterweight. The cable then, making a 90 degree turn, follows the recess 150 to the end surface 154 and is tightly fastened there by means of a screw 234. The cable 230 is taut so that the knot 232 is firmly against the side of the counterweight and that there is no play in the cable or pulleys. A clamp 236 secures a portion of the cable 230 tightly against the side of the post 178 by means of a screw 238 being threaded into a hole in the clamp. This couples the carriage 64 to the counterweight 80 so that any movement of the carriage along the guide rails 74 and 76 causes a similar movement of the counterweight in the opposite direction, within the range of movement of the mechanism. The carriage 64 and associated clamping member 66 are made of aluminum while the counterweight 80 is made of steel. The counterweight is sized to have a mass approximately equal to the combined masses of the carriage, clamping member and the cable 10 so that the carriage is in balance and remains motionless even when the tool 40 is tilted somewhat off the horizontal plane shown at 240 in FIG. 3. Alternatively, the cable 230 and pulley 106 arrangement could provide a mechanical advantage where movement of the carriage would result in an increased or reduced amount of movement of the counterweight. In this case the mass of the counterweight with respect to the combined masses of the cable and carriage would be proportional thereto, that is it would be correspondingly greater if its movement were reduced or less if its movement were increased. As shown in FIG. 7, a pair of cover plates 242 and 244 are attached to the top surfaces 92 and 94, respectively, of the base 62 by means of four screws 246. These cover plates serve to retain the cable support bar within the slot 96 and retain the latch 136 within its recess 134. An extension spring 250 has one end attached to a pin 252 that is pressed into a hole in the cover plate 244 and the other end attached to the front of the carriage 64 by means of a screw 254 that is threaded into a hole 256 in the carriage. The spring 250 urges the carriage 64 to the left with respect to the base 62, as viewed in FIG. 7, to the position shown. The spring 250 is quite delicate and requires a force of only about 50 grams to extend it. This spring provides the abutting force that holds the tip of the optical fiber 26 in engagement with the optical fiber 22 during crimping of the crimp contact 14 onto the optical fiber 26.

In operation, the carriage assembly 60 is removed from the handle and a prepared cable 10 is positioned in the cable guide groove 192 with the optical fiber 26 in position in the V groove 200 of the Carriage 64 and the V groove 120 of the cable support bar 116. The clamping member 66 is then closed to the position shown in FIGS. 6 and 8 and the quarter turn fastener 210 secured in place. The cable support bar 116 is then extended by means of the spring 124, by releasing the latch 136, to the position shown in phantom lines in FIG. 6 so that the optical fiber 26 is supported near its tip. This is required because the cable 10 has previously been coiled for storage and handling and the free end of the thin optical fiber exhibits a tendency to return to that coiled position. Note that prior to preparing the end of the cable 10 and loading it into the carriage assembly 60, the strain relief 20, crimp eyelet 18, and housing 16 are threaded onto the cable 10, as shown in FIG. 1. The carriage assembly 60 is then placed in a scribing tool and the optical fiber 26 cut to length, and then the assembly is placed in a cleaning tool to remove all foreign matter. A crimp contact 14 is loaded into position in the connector nest 44. The carriage assembly 60 is then assembled to the handle 42 by sliding the flanges 90 into the slots 50 and concurrently sliding the key 88 into the keyway 48 and gently moving the carriage assembly toward the connector nest 44. As movement continues, the cable support bar 116 engages a stop surface 258, as best seen in FIG. 5, and begins to retract into the carriage and extending the spring 124 until the latch 136 snaps into latching engagement with the notch 143. At this point the optical fiber 26 has entered the opening 30 of the crimp contact 14. As movement continues, the tip of the optical fiber 26 engages the tip of the optical fiber 22 causing the leftward movement of the carriage 64 to stop, however, movement of the base 62 continues a short distance to a stop, not show. The continued movement for a short distance, in the present example, is about one millimeter and extends the spring 250 by that amount. This extension of the spring 250 applies an abutting force of about 50 grams to the point of engagement of the two optical fibers. The handle is then actuated so that the crimp tooling actuated by the linkage 45 will crimp the crimp contact onto the optical fiber 26 in the usual manner. The cable 10 and attached crimp contact is then removed from the tool 40 and the housing 16, crimp eyelet 18, and strain relief 20 installed in the usual manner. Note that during crimping of the crimp contact onto the optical fiber 26, the hand tool 40 is normally held in the position shown in FIG. 3 with the bed 46 level with the horizontal plane 240. However, should it be operated with the bed tilted slightly with respect to the plane 240, the counterbalance 80 will offset the affect of gravity on the carriage 64 and maintain the abutting force of about 50 grams.

An important advantage of the present invention is that an optical fiber that has a tendency to coil is held relatively straight while it is inserted, without stubbing, into a crimp contact. Additionally, the hand tool of the present invention maintains a substantially constant abutting force on the point of engagement between the optical fiber of the cable and the optical fiber of the connector contact, independent of the effects of gravity. The present invention provides a hand tool that is simple to operate, effective, and relatively inexpensive to manufacture.

I claim:

1. In a tool for attaching an end of an optical fiber of a fiber optic cable to a connector, said tool having a frame, a nest within said frame for receiving said connector, and crimping apparatus coupled to said frame for terminating said cable to said connector, a carriage assembly coupled to said frame and arranged for holding said cable and for moving said end of said optical fiber along a first axis in a first direction toward and into abutting engagement with said connector and in a second direction, opposite said first direction, away from said connector, and during said termination arranged to maintain said end of said optical fiber in said abutting engagement with said connector at a predetermined level of force that is substantially unaffected by the force of gravity, comprising:

a base, a carriage for holding said cable slidably coupled to said base, and a counterweight coupled to said carriage and said based said counterweight having a mass proportional to the combined masses of said cable and said carriage and movable only along a second axis that is parallel to said first axis, so that when said carriage moves in said first or second directions, said counterweight moves in an opposite direction.

2. The tool according to claim 1 wherein said first axis is coaxial with the longitudinal axis of said optical fiber.

3. The tool according to claim 1 including a handle attached to said frame for manually holding said tool during said termination operation.

4. The tool according to claim 1 wherein said carriage assembly includes a low friction slide arranged for effecting said slidable coupling of said carriage to said base so that movement of said carriage is confined to said first and second directions.

5. The tool according to claim 4 wherein said low friction slide comprises a pair of cylindrically shaped shafts attached to said base so that their longitudinal axes are parallel to said first axis, and at least one bearing surface arranged on each said shaft, said bearing surfaces attached to said carriage.

6. The tool according to claim 5 wherein said carriage includes a lower portion and an upper portion that is hingedly attached thereto, said bearings being arranged in bores formed in said lower portion.

7. The tool according to claim 1 wherein said slidable coupling of said counterweight to said carriage and said carriage to said base is effected by means of a pair of pulleys journaled for rotation in said base and a cable in engagement with said pulleys and arranged so that both ends of said cable are attached to said counterweight and a portion of said cable away from said cable ends is attached to said carriage.

8. The tool according to claim 7 wherein said base includes a first cutout and a portion of said carriage is disposed within said first cutout and moves therewithin during said movement of said carriage along said second axis, and said portion of said carriage has a second cutout and said counterweight is disposed within said second cutout and moves therewithin during said movement of said carriage along said second axis.

9. The tool according to claim 8 wherein said portion of said carriage comprises four spaced apart posts that project away from said carriage and into said first cutout, and wherein said low friction slide comprises a pair of cylindrically shaped shafts attached to said base so that their longitudinal axes are parallel to said first axis and extending through said first cutout, and at least one bearing surface arranged on each said shaft, said bearing surfaces attached to said posts.

10. The tool according to claim 9 wherein said at least one bearing surface includes two substantially flat opposed surfaces in engagement with opposite sides of one of said shafts.

11. The tool according to claim 1 wherein said mass of said counterweight is substantially equal to said combined masses of said cable and said carriage.

* * * * *